United States Patent [19]

Asada

[11] 4,228,421
[45] Oct. 14, 1980

[54] PATTERN IDENTIFICATION SYSTEM

[75] Inventor: Haruo Asada, Kawasaki, Japan

[73] Assignee: Tokyo Shibaura Denki Kabushiki Kaisha, Kawasaki, Japan

[21] Appl. No.: 22,875

[22] Filed: Mar. 22, 1979

[30] Foreign Application Priority Data

Mar. 28, 1978 [JP] Japan ................................. 53-34803

[51] Int. Cl.$^2$ ............................................. G06K 9/12
[52] U.S. Cl. .................... 340/146.3 MA; 340/146.3 Q
[58] Field of Search .......... 340/146.3 MA, 146.3 AG, 340/146.3 AC, 146.3 H; 364/725, 728, 731

[56] References Cited

U.S. PATENT DOCUMENTS

| | | | |
|---|---|---|---|
| 3,688,267 | 8/1972 | Iijima et al. | 340/146.3 MA |
| 3,810,093 | 5/1974 | Yasuda et al. | 340/146.3 MA |
| 3,902,160 | 8/1975 | Kawa | 340/146.3 MA |
| 3,906,446 | 9/1975 | Iijima et al. | 340/146.3 MA |
| 4,005,385 | 1/1977 | Joynson et al. | 340/146.3 MA |

*Primary Examiner*—Leo H. Boudreau
*Attorney, Agent, or Firm*—Oblon, Fisher, Spivak, McClelland & Maier

[57] ABSTRACT

A covariance matrix of a set of m number of column components of a two-dimensional input pattern and a covariance matrix of a set of n number of row components are obtained. The column covariance matrix and a column covariance matrix of a set of column components of a standard pattern belong to the corresponding one of various categories are multiplied and summed to obtain a column multiply-sum data and the row covariance matrix and a row covariance matrix of a set of row components of the standard pattern are multiplied and summed to obtain row multiply-sum data. The column and row multiply-sum data are multiplied by a multiplier to obtain product data. A maximum detector detects a maximum product data from the product data obtained by the multiplier with respect to all categories. The category corresponding to the maximum product data is recognized as belonging to the input pattern.

7 Claims, 5 Drawing Figures

PATTERN IDENTIFICATION SYSTEM

BACKGROUND OF THE INVENTION

This invention relates to a pattern identification system.

In the prior art pattern identification system, a standard pattern is prepared for each of various categories and the feature of an input pattern is taken out. The similarity between an input pattern and the standard pattern of each category is calculated. The input pattern is recognized as belonging to the category the standard pattern of which is found more similar to the input pattern than any other standard patterns. The standard pattern of each category is prepared by statistically analyzing a number of patterns which belong to a specific category. The standard pattern prepresents a set of patterns belonging to one category. Thus, an input pattern is identified in accordance with its similarity to a set of patterns which are generally represented by a standard pattern. A method for identifying a pattern as above mentioned is called "multiple similarity method;" disclosed in, for example, U.S. Pat. No. 3,688,297, Aug. 29, 1972. The method, however requires much data to calculate similarity between an input pattern and a standard pattern and needs a thesaurus memory of a memory capacity large enough to store all the standard patterns.

SUMMARY OF THE INVENTION

It is an object of this invention to provide a pattern identification system which can reduce the memory capacity for storing standard patterns and minimize the calculation for obtaining the similarity of an input pattern to each standard pattern.

According to this invention, an input pattern is divided into a plurality of pattern components, no matter whether it is a single pattern or it is constituted by a set of a plurality of patterns. A caliculation of a covariance matrix for a set of the pattern components is carried out. A similarity of the input pattern to each of standard patters is calculated on the basis of the result of the covariance matrix for the input pattern and that for the standard pattern.

Suppose a pattern is expressed as an n-dimensional column vector. Then the components of the column vector represent the brightness of a specific part of the pattern if the pattern is a figure, letter or character. They represent the amplitude of an acoustic wave at a specific time if the pattern is sound.

An input pattern or a set of pattern components is expressed as follows:

$$\{Yj; j=1, N\} \quad (1)$$

A set of patterns which are known to belong to a specific category $\beta$ is expressed as follows:

$$\{X\beta i; i=1, M\} \quad (2)$$

Similarity $S[\{Yj\}, \{X\beta i\}]$ between set $\{Yj\}$ and set $\{X\beta i\}$ is calculated in the following way.

First, column vector X of covariance matrix of set $\{X\beta i\}$ is obtained as follows:

$$X \triangleq \sum_{i=1}^{M} X\beta i \cdot X\beta i^t \quad (3)$$

In equation (3), $X^t$ denotes the transposition of the column vector X, i.e. row vector. Then row vector Y of covariance matrix of set $\{Yj\}$ is obtained as follows:

$$Y \triangleq \sum_{j=1}^{N} Yj \cdot Yj^t \quad (4)$$

Column vector X and row vector Y represent symmetrical column and row of (n, n) type. The inner product (X, Y) of column vector X and row vector Y is then calculated as follows:

$$(X, Y) \triangleq \sum_{k=1}^{N} \sum_{l=1}^{N} xkl \cdot ykl \quad (5)$$

In equation (5), xkl denotes elements k and l of column vector X, and ykl elements k and l of row vector Y. Norm $||X||$ of column vector X is calculated by the following equation, using the inner product (X, Y) of column vector X and row vector Y:

$$||X|| \triangleq \sqrt{(X, X)}$$
$$= \sum_{k=1}^{N} \sum_{l=1}^{N} \quad (6)$$

Similarity $S[\{Yj\}, \{X\beta i\}]$ between set $\{Yj\}$ and set $\{X\beta i\}$ is therefore defined as a value proportional to the inner product (X, Y) of column vector X and row vector Y of covariance matrix. Therefore:

$$S(\{Yj\}, \{X\beta i\} \triangleq \frac{(Y \cdot X)}{||Y|| \cdot ||X||} \quad (7)$$

Equation (7) is based on the idea that the features of set $\{Yj\}$ (i.e. pattern components of the input pattern) and set $\{X\beta i\}$ (i.e. pattern components known to belong to category $\beta$) are fully mirrored by the covariance matrix.

As metioned above, A covariance matrix of a set of patterns known to belong to a category is calculated and stored into a memory as a standard pattern. A convariance matrix of a set of pattern components which constitute an input pattern is calculated. Next, the inner product of elements of the covariance matrixes of the input pattern and standard pattern is calculated. Such calculations are carried out over all the categories. From the obtained results is detected a maximum value and the category corresponding to the maximum value is recognized as a category of the input pattern.

DETAILED DESCRIPTION OF THE PREFERRED EMBODIMENT

Figure 1:
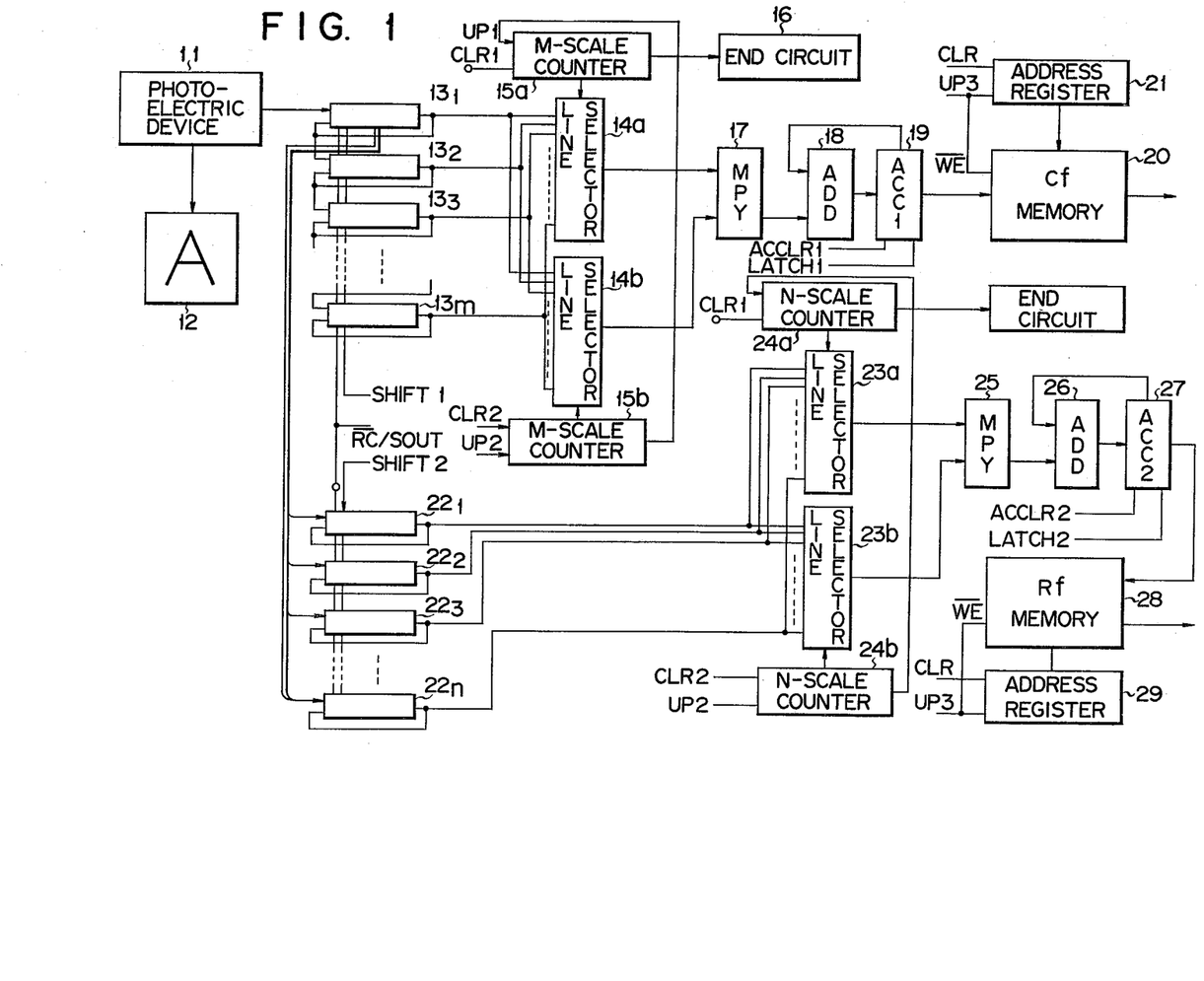
FIG. 1 is a block circuit diagram of a convariance matrix calculation circuit used in a pattern identification system according to this invention.
Figure 2:
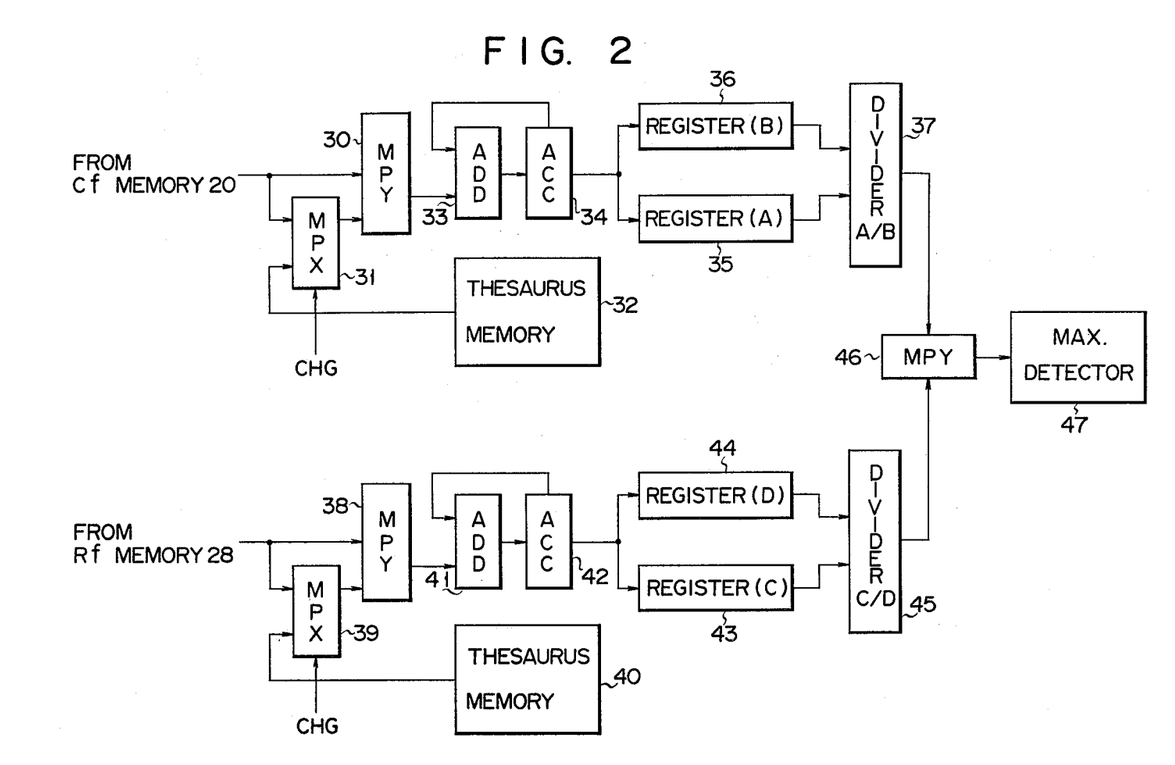
FIG. 2 is a block circuit diagram of a pattern similarity calcualtion circuit of the pattern identification system shown in FIG. 1.

Now referring to FIGS. 1 to 4, a pattern identification system, an embodiment of this invention, will be described. The system is provided with a covariance matrix calculation circuit as illustrated in FIG. 1 and a similarity calculation circuit as shown in FIG. 2. A photoelectric device 11 of the convariance matrix calculation circuit convertes an input pattern into analog electric signals and further into digital signals. The output terminal of the device 11 is coupled to the input terminal of an n-bit first shift register $13_1$. There are provided other n-bit shift registers $13_2$, $13_3$, $13_4$, ... $13_m$. The output terminal of the first shift register $13_1$ is connected to the input terminal of its own and to the input terminal of the second shift register $13_2$. Likewise, the output terminal of the second shift register $13_2$ is coupled to the input terminal of its own and the input terminal of the third shift register $13_3$, and so forth. Moreover, the output terminal of every shift register is connected to the corresponding input terminals of line selectors 14a and 14b. The line selectors 14a and 14b have their control input terminals coupled to the output terminal of an m-scale counter 15a and the output terminal of an m-scale counter 15b, respectively. The output terminal of the m-scal counter 15a is coupled to the control input terminal of the m-scale counter 15b. The carry output terminal of the m-scale counter 15b is coupled to the input terminal of an up-count terminal of the m-scale counter 15a. The carry output terminal of the counter 15a is connected to an end circuit 16.

The output terminals of the line selectors 14a and 14b are connected to the input terminal of a multiplier 17, the output terminal of which is connected to an adder 18. The output terminal of the adder 18 is coupled to the input terminal of an accumulator 19. The accumulator 19 is cleared upon receipt of a signal ACCLR 1 and is latched upon receipt of a signal LATCH 1. The contents of the accumulator 19 are supplied to the input terminal of the adder 18, and the output terminal of the accumulator 19 is coupled to a Cf memory 20 so that the contents of the accumulator 19 are stored into the Cf memory 20. Each address of the memory 20 is designated by an address signal from an address register 21, and input data are written into, or read out from, an designated address.

The parallel output terminals of the n-bit shift register $13_1$ are coupled to the input terminals of m-bit shift registers $22_1$, $22_2$, ... $22_n$. The output terminal of every m-bit shift register is coupled to the corresponding input terminals of line selectors 23a and 23b. Like the above-mentioned line selectors 14a and 14b, these line selectors 23a and 23b are coupled to a multiplier 25. They are coupled also to n-scale counters 24a and 24b, respectively. The output terminal of the multiplier 25 is connected to an accumulator 27 through an adder 26. The contents of the accumulator 27 are stored into an Rf memory 28. The addresses of the Rf memory 28 are controlled by an address register 29.

The pattern similarity calculation circuit as shown in FIG. 2 is constituted by two units, a column pattern calculation unit and a row pattern calculation unit.

The column pattern calculation unit has a multiplier 30 with one input terminal coupled to the output terminal of the Cf memory 20 of the covariance matrix calculation circuit shown in FIG. 1. The unit further has a multiplexer 31 with one input terminal coupled also to the output terminal of the Cf memory 20. The other input terminal of the multiplexer 31 is coupled to the output terminal of thesaurus memory 32. The output terminal of the multiplexer 31 is coupled to the other input terminal of the multiplier 30. The output terminal of the multiplier 30 is coupled to an accumulator 34 through an adder 33. The output terminal of the accumulator 34 is connected to registers 35 and 36. The output terminals of these registers 35 and 36 are coupled to the input terminal of a divider 37.

The row pattern calculation unit is similar to the column pattern calculation unit. That is, it has a multiplier 38 and a multiplexer 39 which are coupled at one input terminal to the Rf memory 28 of the covariance matrix calculation circuit. The other input terminal of the multiplexer 39 is coupled to the output terminal of a thesaurus memory 40. And an adder 41, an accumulator 42, two registers 43 and 44 and a divider 45 are coupled to one another in the same manner as in the column pattern calculation unit.

Figure 3A:
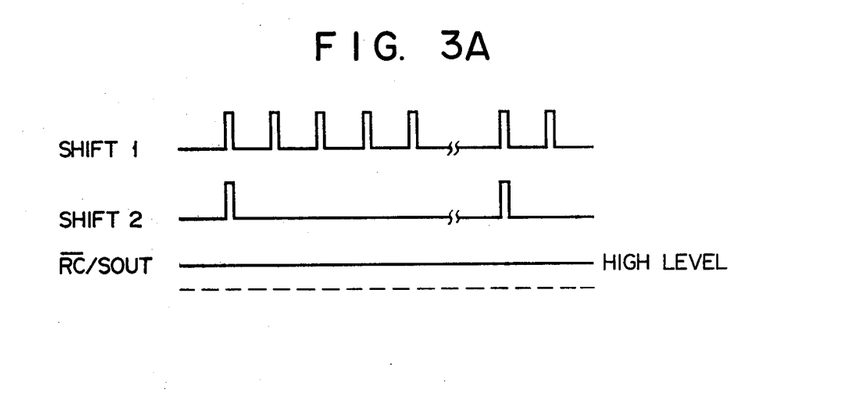
FIGS. 3A and 3B are time charts of signals for driving the circuits shown in FIGS. 1 and 2.
Figure 3B:
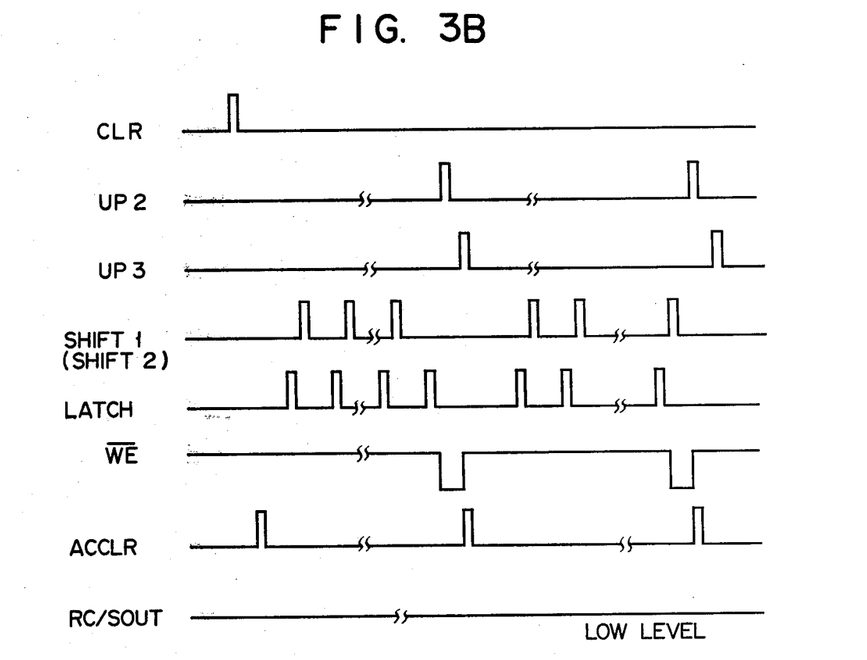

With reference to FIGS. 3A and 3B, it will now be described how the pattern identification system of FIGS. 1 and 2 operates.

An digital pattern signal transferred from the photoelectric device 11 is stored bit by bit into the n-bit shift register $13_1$ in response to shift pulses SHIFT 1. When the n-bit shift register $13_1$ filled up with first pattern bit data constituting a first column pattern component, n number of bit data in the shift register $13_1$ are transferred therefrom to n number of m-bit shift registers $22_1$, $22_2$, ... $22_n$ through the parallel output terminals of the shift register $13_1$, respectively, in response to a shift pulse SHIFT 2. Next, in response to the succesive shift pulses SHIFT 1 second pattern bit data constituting a second column pattern component are stored from the photoelectric device 1 into the shift register $13_1$. In this time, the bit data stored in the shift register $13_1$ are transferred bit by bit to the next n-bit shift register $13_2$ since a signal $\overline{RC/SOUT}$ is a high level.

When the shift register $13_1$ is filled up with the second pattern bit data, in response to the shift pulse SHIFT 2 n number of m-bit shift registers $22_1$, $22_2$, ... $22_n$ receive the second pattern bit data from the n-bit shift register $13_1$, respectively.

As mentioned above, every time any n-bit shift register is filled up with pattern bit data, it transfers its contents, i.e. pattern bit data, to the n-bit shift register in the next stage. Simultaneously, the m-bit shift registers $22_1$, $22_2$, ... $22_n$ receive each one bit data from the n-bit shift register $13_1$. Similar pattern data transfers are repeated until all the shift registers $13_1$, $13_2$, ... $13_m$ and $22_1$, $22_2$, ... $22_n$ are filled up. This is how all the pattern data representing an input pattern 12 are stored into the n-bit shift registers $13_1$, $13_2$, ... $13_m$ and the m-bit shift registers $22_1$, $22_2$, ... $22_n$. That is, m column pattern components of m x n pattern components constituting the input pattern 12 are stored into the n-bit shift registers $13_1$, $13_2$, ... $13_m$, respectively, and n row pattern components into the m-bit shift registers $22_1$, $22_2$, ... $22_n$, respectively.

According to this invention, an input pattern is identified according to a covariance matrix of a set of such row pattern components and a covariance matrix of a set of such column pattern components.

Suppose the input pattern 12 is a pattern F of (m, n) row-column type. Then, the pattern F is expressed as follows:

$$F = (f_1, f_2 \ldots f_n) \quad (8)$$

Pattern F can therefore be considered a set of m-dimensional vectors, i.e. $\{f_i, i=1,2, \ldots n\}$. From set $\{f_i\}$, a covariance matrix Cf of a set of column pattern components can be obtained as shown below:

$$Cf = \sum_{i=1}^{n} f_i f_i^t \quad (9)$$

More specifically, covariance matrix Cf is obtained by the convariance matrix calculation circuit shown in FIG. 1 in the following manner. That is, the m-scale counters 15a and 15b are cleared upon receipt of a clear signal CLR shown in FIG. 3B. Then, the line selectors 14a and 14b receive a first bit data of the column pattern data stored in the n-bit shift register $13_1$ and supply the same to the multiplier 17. The multiplier 17 therefore receives two identical bit data and obtains the square of the bit data. The square of the bit data is supplied to the adder 18 and then latched by the accumulator 19. The line selectors 14a and 14b then receive a second bit data of the column pattern data stored in the n-bit shift register $13_1$, and the multiplier 17 obtained the square of the second bit data, which is added by the adder 18 to the square of the first bit data. The sum of the square of the first bit data and the square of the second bit data is latched by the accumulator 19 in response to a latch signal LATCH. This calculation is repeated until the square of the n-th bit data is obtained. In this calculation, the contents of the shift register $13_1$ are circulated without being transferred to the shift register $13_2$ since the signal $\overline{RC/SOUT}$ is a low level. The data accumulated in the accumulator 19 is stored, in response to a signal $\overline{WE}$, into an address of the Cf memory 20 which has been designated by an address signal from the address register 21.

Once the data has been stored into the Cf memory 20, a count-up signal UP2 is supplied to the m-scale counter 15b and counted thereby. When it counts the signal UP, the m-scale counter 15b causes the line selector 14b to select the line coupled to the n-bit shift register $13_2$. Since the contents of the m-scale counter 15a is maintained, the line selector 14a still selects the line coupled to the n-bit shift register $13_1$. As a result, the column pattern bit data stored in the shift register $13_1$ are supplied to the multiplier 17 bit by bit through the line selector 14a and also the column pattern bit data stored in the shift register $13_2$ to the multiplier 17 bit by bit through the line selector 14b, thereby calculating the covariance matrix Cf of the contents in the n-bit shift registers $13_1$ and $13_2$. The covariance matrix Cf thus obtained is then stored into the Cf memory 20. In this way, convariance matrices Cf are calculated and stored into the Cf memory 20 until the m-scale counter 15b counts m signals UP. When it counts m signals UP, the counter 15b generates a carry signal, which is supplied to the counter 15a. Upon receipt the carry signal, the counter 15a causes the line selector 14a to select the line coupled to the n-bit shift register $13_2$. Then, the covariance matrix Cf of the contents in the shift registers $13_2$ and $13_3$, the convariance matrix Cf of the contents in the shift registers $13_2$ and $13_4$, the covariance matrix Cf of the contents in the shift registers $13_2$ and $13_5$ and so forth are obtained in the same manner as mentioned above. The covariance Cf matrix of the contents in the shift register $13_3$ and the contents in each of the following shift registers $13_4, 13_5, \ldots 13_m$, the covariance matrix Cf of the contents in the shift register $13_4$ and the contents in each of the following shift registers $13_5, 14_6, \ldots 13_m$, and so forth are calculated until the m-scale counter 15a counts m carry signals from the m-scale counter 15b. Upon counting m carry signals, the counter 15a produces an end signal to drive the end circuit 16.

Covariance matrices Rf of row pattern components, which are expressed as follows, are calculated in the same manner as the covariance matrices Cf of column pattern components are calculated as mentioned above.

$$Rf = \sum_{i=1}^{m} d_i d_i^t \quad (10)$$

That is, first the row pattern bit data in the m-bit shift register $22_1$ are read out, and the covariance matrix Rf is calculated on the basis of the row pattern bit data. Then, the covariance matrix Rf of the row bit data in the m-bit shift registers $22_1$ and $22_2$ is calculated. Further, the covariance matrix Rf of the contents in the shift register $22_1$ and the contents in each of the shift registers $22_3, 22_4, \ldots 22_n$, the covariance matrix Rf of the contents in the shift register $22_2$ and that in each of the shift registers $22_3, 22_4, \ldots 22_n$, the covariance matrix Rf of the contents in the shift register $22_3$ and that in each of the shift registers $22_4, 22_5, \ldots 22_n$ and so forth are calculated until the n-scale counter 24a counts n carry signals from the n-scale counter 24b. All the covariance matrices Rf thus obtained are stored into the Rf memory 28.

Using the convariance matrices Cf and Rf now stored in the Cf memory 20 and the Rf memory 28, the pattern similarity calculation circuit shown in FIG. 2 calculate the similarity of the input pattern 12 to a standard pattern, i.e. a set of patterns known to belong to a category $\beta$. To ahieve the calculation, covariance matrices Rg and Cg($\beta$) of pattern components known to belong to category $\beta$ are calculated and stored into the thesaurus memories 32 and 40, respectively. The covariance matrices Rg and Cg($\beta$), which are expressed as follows, are calculated in such a way as will hereinlater be described.

$$Cg(\beta) = \sum_{k=1}^{k} \sum_{j=1}^{n} g_{\beta kj} g_{\beta kj}^t \quad (11)$$

$$Rg = \sum_{k=1}^{k} \sum_{j=1}^{m} e_{kj} e_{kj}^t \quad (12)$$

Using covariance matrices Cf, Cg($\beta$) and based on equation (7), column pattern similarity Sc[F, $\beta$] between the input pattern F and the category $\beta$ can be calculated as follows:

$$S_C[F, \beta] = \frac{(Cf \cdot Cg(\beta))}{||Cf|| \cdot ||Cg(\beta)||} \quad (13)$$

Similarly, using covariance matrices Rf and Rg, row pattern similarity $S_R[F, \beta]$ between the input pattern F and the category $\beta$ can be calculated as follows:

$$S_R[F, \beta] = \frac{(Rf \cdot Rg(\beta))}{||Rf|| \cdot ||Rg(\beta)||} \quad (14)$$

Neither similarity $S_C[F, \beta]$ nor similarity $S_R[F, \beta]$ represents the similarity of a two-dimensional pattern. To obtain the similarity $S[F, \beta]$ of a two-dimensional pattern, it is necessary to obtain the product of $S_C[F, \beta]$ and $S_R[F, \beta]$. That is:

$$S[F, \beta] = S_C[F, \beta] \cdot S_R[F, \beta] \tag{15}$$

Now, it will be described how to calculate similarity $S[F, \beta]$ by the pattern similarity calculation circuit shown in FIG. 2.

A Cf data is supplied from the Cf memory 20 to the multiplier 30 and the multiplexer 31. The multiplier 30 multiplies the Cf data coming directly from the Cf memory with the Cf data coming from the multiplexer 31. The product is supplied to the adder 33 and latched by the accumulator 34. A second Cf data from the Cf memory is arithmetically processed by the multiplier 30 and latched by the accumulator 34 in the same way, and is added to the contents of the adder 33. The other Cf data from the Cf memory 20 are processed in the same manner. The data accumulated in the accumulator 34 about all the column pattern components of the input data F, are stored into the register 36 as norm data. Then, a charge signal CHG is supplied to the multiplexer 31. Upon receipt of the signal CHG, the multiplexer 31 supplies the multiplier 30 with data from the thesaurus memory 32, i.e. $Cg(\beta)$ data. A Cf data from the Cf memory 20 is therefore multiplied with $Cg(\beta)$ data, and the product is supplied to the adder 33 and then latched by the accumulator 34. Thus, the multiplier 30, the adder 33 and the accumulator 34 cooperate to obtain the inner product of Cf and $Cg(\beta)$. The inner products of the other Cf data and $Cg(\beta)$ data are obtained in the same way. All the inner products with respect to all the column pattern components are stored into the register 35. The inner product data A and the norm data B are supplied to the divider 37 from the registers 35 and 36, respectively. The divider 37 divides the inner product data A with the norm data B.

In the meantime, a Rf data is supplied from the Rf memory 28 to the multiplier 38 and the multiplexer 39. The multiplier 38 multiplies the Rf data coming directly from the Rf memory 28 with the Cf data coming from the multiplexer 39. The product is supplied to the adder 41 and latched by the accumulator 42. All the other Rf data from the Rf memory 28 are arithmetically processed in the same way. The data accumulated in the accumulator 42 about all the row pattern components of the input pattern F, are stored into the register 44 as norm data. Then, a charge signal CHG is supplied to the multiplexer 39. Upon receipt of the signal CHG, the multiplexer 39 supplies the multiplier 38 with Rg thesaurus pattern data from the thesaurus memory 40. A Rf thesaurus pattern data from the Rf memory 28 is therefore multiplied with Rg data, and the product is supplied to the adder 41 and then latched by the accumulator 42. Thus, the multiplier 38, the adder 41 and the accumulator 42 cooperate to obtain the inner product of Rf and Rg. The inner products of the other Rf data and Rg data are obtained in the same way. All the inner products with respect to all the row pattern components are stored into the register 43. The inner product data C and the norm data D are supplied to the divider 45 from the registers 43 and 44, respectively. The divider 45 divides the inner product data C with the norm data D.

The output data of the dividers 37 and 45, i.e. A/B data and C/D data, are supplied to a multiplier 46 of the pattern similarity calculation circuit. The multiplier 46 carries out the multiplication as expressed in equation (15), thereby obtaining similarity $S[F, \beta]$ of the input pattern F which is a two-dimensional pattern.

The similarity of the input pattern F to the pattern of each of all the categories is calculated by the pattern similarity calculation circuit in the above-mentioned manner. All the similarities thus obtained are supplied to the maximum detector 47. The maximum similarity is detected from all the similarities by the maximum detector 47, and the input pattern F is therefore recoginized as belonging to the category indicated by the maximum similarity.

The thesaurus pattern i.e. standard pattern of category $\beta$ is represented by the covariance matrices Rg and $Cg(\beta)$ which are expressed by equations (11) and (12), respectively. The memory capacity for storing one standard pattern is therefore:

$$\frac{n(n+1)}{2} + \frac{m(m+1)}{2}.$$

According to the known multiple similarity method, an input pattern is considered an $(n \times m)$-dimensional pattern, and its similarity is expressed as follows:

$$S^2[Y, \beta] = \frac{\sum_{s=1}^{n \cdot m} \lambda_s (Y \phi_s)^2}{||Y||^2 \cdot \lambda_1} \tag{16}$$

The multiple similarity method therefore requires a memory of $n^2 m^2$ for storing one standard pattern. If $n = M = 10$, the memory capacity for storing one standard pattern is 10000, whereas the pattern identification system of this invention requires a memory capacity of only $$110 \left( = \frac{n(n+1)}{2} + \frac{m(m+1)}{2} \right)$$

for storing one standard pattern. Obviously, the data to calculate and memory capacity to store standard patterns in the system of this invention are much reduced in comparision with those in the conventional multiple similarity method.

Figure 4:
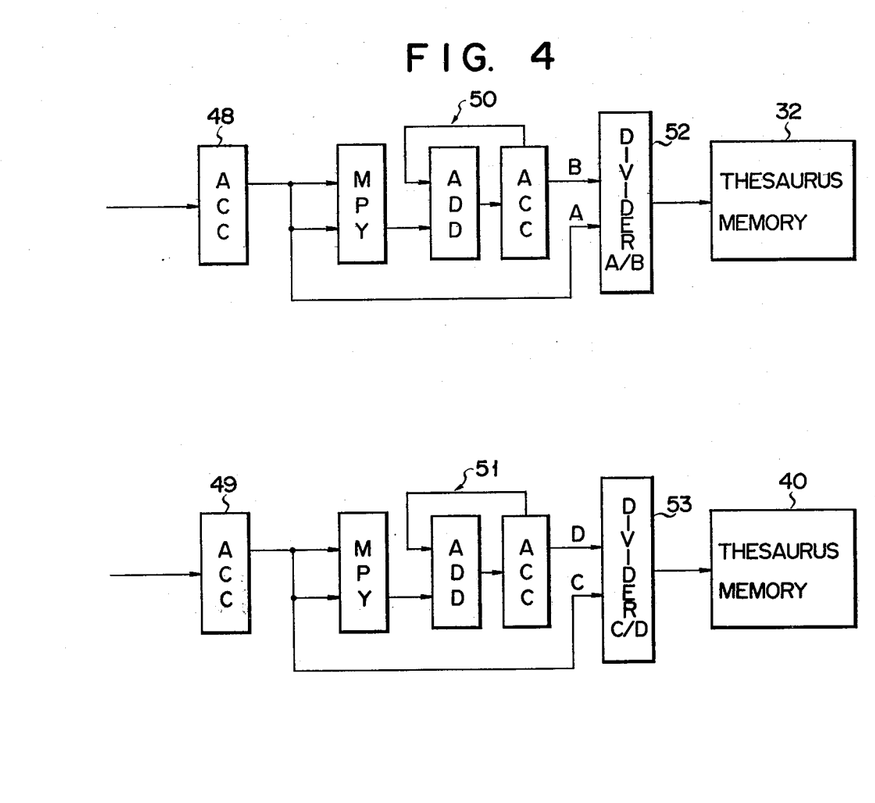
FIG. 4 is a block circuit diagram of a circuit for forming standard patterns.

Now referring to FIG. 4, it will be described how to form a standard pattern which will be stored partly in the thesaurus memory 32 and partly in the thesaurus memory 40.

Covariance matrix Cg of column pattern components known to belong to category $\beta$ and covariance Rg of row pattern components known to belong to category $\beta$ are calculated by such a covariance calculation circuit as illustrated in FIG. 1. Cg is supplied to an accumulator 48, and the output data of the accumulator 48 is calculated by a norm calculation circuit 50 to obtain a column norm B. The contents A of the accumulator 48 and the norm B are supplied to a divider 52, and the former is divided by the latter thereby to obtain a standard column pattern which is proportional to the contents A of the accumulator 48 and which represents the column pattern components of category $\beta$. The standard column pattern data is written into the address of the thesaurus memory 32 which is allotted to category $\beta$. Similarly, a standard row pattern data which is proportional to the contents C of an accumulator 49 and which represents the row pattern components of category $\beta$ is obtained by a norm calculation circuit 51 and a divider 53 and is written into the address of the thesaurus memory 40 which is allotted to category β. In this way, standard column patterns and standard row patterns of other categories are obtained and written into the addresses of the thesaurus memories 32 and 40. Consequently, the thesaurus memories 32 and 40 store the standard patterns of all the categories. The category indicated by the maximum similarity is recognized by the address code read out together with the standard pattern data from the thesaurus memory.

As mentioned above, this invention much reduces data to calculate standard patterns and memory capacity to store the standard patterns. The pattern identification system according to this invention can therefore identify input patterns at a high speed.

What is claimed is:

1. A pattern identification system comprising memory means for storing a plurality of standard pattern data each calculated based on covariance matrix of a set of pattern components known to belong to a corresponding one of a plurality of categories; calculation means for obtaining an input pattern data based on covariance matrix of a set of pattern components of an input pattern; multiplier-adder means for multiplying and summing the element included in the covariance matrix of the input pattern data and the corresponding element of the covariance matrix of each standard pattern data; detection means for detecting the largest of the results obtained by the multiplier-adder means with respect to all categories; and identification means for identifying the input pattern as belonging to the category represented by the largest result detected by the detection means.

2. A pattern identification system comprising memory means for storing a plurality of standard column pattern data each calculated based on covariance matrix of a set of column pattern components of a two-dimensional pattern known to belong a corresponding one of each of a plurality of categories and a plurality of standard row pattern data each calculated based on covariance matrix of a set of row pattern components of the two-dimensional pattern; calculation means for obtaining a column covariance matrix data representing covariance matrix of a set of column pattern components of a two-dimensional input pattern and a row column covariance matrix data representing covariance matrix of a set of row pattern components of the two-dimensional input pattern; multiplier-adder means for multiplying and summing the column covariance matrix data corresponding to the standard and input column pattern components to obtain column multiply-sum data and multiplying and summing the row covariance matrix data corresponding to the standard and input row pattern components to obtain row multiply-sum data; means for multiplying the column multiply-sum data and the row multiply-sum data, respectively, to obtain product data; detecting means for detecting a product data repesenting a maximum from the product data obtained by the multiplying means with respect to all categories; and identification means for identifying the two-dimensional input pattern as belonging to the category represented by the maximum product data detected by the detection means.

3. A pattern identification system according to claim 2, wherein said calculation means comprises m number of n-bit shift registers for storing m number of column pattern component data corresponding to m number of column pattern components of a two-dimensional input pattern; n number of m-bit shift registers for storing n number of row pattern component data corresponding to n number of row pattern components of the two-dimensional input pattern; a column covariance matrix calculation circuit for receiving at a time two column pattern component data from the n-bit shift registers so as to obtain covariance matrix of the two column pattern component data; a row covariance matrix calculation circuit for receiving at a time two row pattern component data from the m-bit shift registers so as to obtain covariance matrix of the two row pattern component data; and memory means connected to the column and row covariance matrix calculation circuits for storing the column and row cavariance matrix data obtained by the column and row covariance matrix calculation circuits.

4. A pattern identification system according to claim 2, wherein said multiplier-adder means comprises a column multiplier circuit for multiplying the column covariance matrix data with each standard column pattern data; a column adder circuit for summing the outputs of the column multiplier circuit; a row multiplier circuit for multiplying the row covariance matrix data with each standard row pattern data; and a row adder circuit for summing the outputs of the row multiplier circuit.

5. A pattern identification system according to claim 2, wherein said memory means includes a summing circuit for summing covariance matrix data corresponding to all two-dimensional patterns known to belong to each category; a norm calculation circuit connected to the summing circuit for obtaining the norm of the covariance matrix data; a divider circuit for dividing the product of the multiplication by the summing circuit by the norm obtained by the norm calculation circuit; and a memory for storing the output of the divider circuit as a standard pattern data.

6. A pattern identification system for identifying an input pattern constituted by m number of column pattern components and n number of row pattern components, compring an input pattern covariance matrix calculation unit including m number of n-bit shift registers for storing m number of column pattern component data corresponding to the column pattern components, n number of m-bit shift registers for storing n number of row pattern component data corresponding to the row pattern components, a column covariance matrix calculation circuit for receiving at a time two column pattern component data from the n-bit shift registers so as to obtain covariance matrix of the two column pattern component data, a row covariance matrix calculation circuit for receiving at a time two row pattern component data from the m-bit shift registers so as to obtain covariance matrix of the two row pattern component data, and memory means for storing the column and row covariance matrix data obtained by teh column and row covariance matrix calculation circuits; and a similarity calculation unit including memory means for storing a plurality of standard column pattern covariance matrix data each calculated based on covariance matrix of column pattern components known to belong to the corresponding one of the categories and a plurality of standard row pattern covariance matrix data each calculated based on covariance matrix of row pattern components, column multiplier-adder means for multiplying and summing the column covariance matrix data read out from the memory means of the input pattern covariance matrix calculation unit and each standard column pattern covariance matrix data, row multiplier-adder means for multiplying and summing the row covariance matrix data read out from the memory means of the input pattern covariance matrix calculation unit and each standard row pattern covariance matrix data, multiplier means for multiplying the output data of the column and row multiplier-adder means so as to obtain product data, detection means for detecting the largest of the product data obtained by the multiplier means, and identifying means for identifying the input pattern as belonging to the category represented by the largest product data detected by the detection means.

7. A pattern identification system according to claim 6, wherein said similarity calculation unit further includes column norm calculation means for obtaining the norm of the column covariance matrix data read out from the memory means of said input pattern covariance matrix calculation unit, column dividing means for dividing the output data of said column multiplier-adder means by the norm data from the column norm calculation means, row norm calculation means for obtaining the norm of the row covariance matrix data read out from the memory means of said input pattern covariance matrix calculation unit, and row dividing means for dividing the output data of said row multiplier-adder means by the norm data from the row norm calculation means, the output data of said column and row dividing means being supplied to said multiplier means of the similarity calcualtion unit.

* * * * *